US012601474B1

(12) United States Patent
Luo

(10) Patent No.: US 12,601,474 B1
(45) Date of Patent: Apr. 14, 2026

(54) WALL LIGHT FIXTURE

(71) Applicant: Chuhong Luo, Guangzhou (CN)

(72) Inventor: Chuhong Luo, Guangzhou (CN)

( * ) Notice: Subject to any disclaimer, the term of this patent is extended or adjusted under 35 U.S.C. 154(b) by 0 days.

(21) Appl. No.: 19/031,681

(22) Filed: Jan. 18, 2025

(51) Int. Cl.

| | |
|---|---|
| ***F21V 23/06*** | (2006.01) |
| ***F21S 8/00*** | (2006.01) |
| ***F21S 9/02*** | (2006.01) |
| ***F21V 21/02*** | (2006.01) |
| ***F21V 23/00*** | (2015.01) |
| ***F21V 23/04*** | (2006.01) |
| ***F21V 29/74*** | (2015.01) |
| ***F21Y 103/00*** | (2016.01) |
| ***F21Y 115/10*** | (2016.01) |

(52) U.S. Cl.
CPC .............. *F21V 23/06* (2013.01); *F21S 8/033* (2013.01); *F21S 9/02* (2013.01); *F21V 21/02* (2013.01); *F21V 23/002* (2013.01); *F21V 23/008* (2013.01); *F21V 23/045* (2013.01); *F21V 29/74* (2015.01); *F21Y 2103/00* (2013.01); *F21Y 2115/10* (2016.08)

(58) Field of Classification Search
CPC .......... F21V 23/06; F21V 29/74; F21V 21/02; F21V 23/002; F21V 23/008; F21V 23/045; F21S 8/033; F21S 9/02
See application file for complete search history.

(56) References Cited

U.S. PATENT DOCUMENTS

| | | | | |
|---|---|---|---|---|
| 7,204,606 | B2 * | 4/2007 | Brass | G01N 21/8803 362/244 |
| 7,214,952 | B2 * | 5/2007 | Klipstein | F21V 23/0414 250/493.1 |
| 7,281,820 | B2 * | 10/2007 | Bayat | F21V 29/75 362/245 |
| 7,360,920 | B2 * | 4/2008 | Dalton | F21V 14/045 362/187 |
| 9,568,171 | B1 * | 2/2017 | Grider | F21V 23/06 |
| 9,801,968 | B2 * | 10/2017 | Graves | A61L 9/12 |
| 9,851,082 | B2 * | 12/2017 | Thompson | F21V 21/0965 |
| 2002/0191396 | A1 * | 12/2002 | Reiff | F21K 9/65 362/183 |
| 2003/0016532 | A1 * | 1/2003 | Reed | F21V 23/04 362/198 |
| 2013/0223043 | A1 * | 8/2013 | Ray | F21V 33/00 362/96 |
| 2020/0003397 | A1 * | 1/2020 | Van Winkle | F21V 15/015 |
| 2020/0049332 | A1 * | 2/2020 | Grider | F21V 3/00 |
| 2023/0204202 | A1 * | 6/2023 | Li | F21V 23/0428 |

* cited by examiner

*Primary Examiner* — Bryon T Gyllstrom
(74) *Attorney, Agent, or Firm* — HOWARD M COHN and Associates, LLC

(57) ABSTRACT

A wall light fixture is provided, including a base, at least one lamp body, a driving circuit board, and a battery module. The at least one lamp body is disposed on the base, the driving circuit board is disposed in the base, and the driving circuit board is electrically connected to the at least one lamp body. The battery module is configured to supply power to the at least one lamp body. The base defines an accommodating cavity, the battery module is detachably disposed in the accommodating cavity. The base defines an accommodating cavity, the battery module is detachably disposed in the accommodating cavity. An access opening is defined at one side of the base, the access opening is communicated with the accommodating cavity for the battery module to be inserted into the accommodating cavity or pulled out of the accommodating cavity.

19 Claims, 12 Drawing Sheets

WALL LIGHT FIXTURE

TECHNICAL FIELD

The present disclosure relates to a wall light fixture.

BACKGROUND

Wall light fixtures are decorative light fixtures mounted on walls for auxiliary lighting. Currently, most of the wall light fixtures are powered by external power sources, while some incorporate built-in rechargeable batteries to suit situations without provision for external power connections. However, since the built-in rechargeable batteries are typically disposed inside corresponding wall light fixtures, extended charging cables are generally required for connecting to external power supplies for charging, or the corresponding wall light fixtures need to be entirely removed to locations with power supplies for charging, operating current wall light fixtures is tedious and inconvenient.

SUMMARY

The present disclosure aims to provide a wall light fixture, including a base, at least one lamp body, a driving circuit board, and a battery module. The at least one lamp body is disposed on the base, the driving circuit board is disposed in the base, and the driving circuit board is electrically connected to the at least one lamp body. The battery module is configured to supply power to the at least one lamp body. The base defines an accommodating cavity, the battery module is detachably disposed in the accommodating cavity. The base defines an accommodating cavity, the battery module is detachably disposed in the accommodating cavity. An access opening is defined at one side of the base, the access opening is communicated with the accommodating cavity for the battery module to be inserted into the accommodating cavity or pulled out of the accommodating cavity. The battery module includes at least one first electrode. The driving circuit board includes at least one second electrode. The at least one first electrode is in contact with the at least one second electrode to establish electrical connection when the battery module is inserted into the accommodating cavity. The at least one first electrode is separated from the at least one second electrode to disconnect the electrical connection when the battery module is pulled out of the accommodating cavity.

According to technical solutions of the present disclosure, the wall light fixture provides the battery module being independent for supplying power, which does not require complex wiring to be connected to an external power supply. Moreover, the battery module is detachably disposed in the accommodating cavity of the base, which is enabled to be taken out for charging, the battery module is mounted and detached in a way of inserting or pulling out, and electrical connection and electrical disconnection are simultaneously achieved with mounting and detaching of the battery module, enabling a simple and quick operation. During use, the battery module is disposed in the accommodating cavity and is prevented from environmental influences.

The battery module includes a housing body, a battery circuit board, and a rechargeable battery, the battery circuit board and the rechargeable battery are disposed in the housing body, the battery circuit board is electrically connected to the rechargeable battery. The at least one first electrode is disposed on the battery circuit board, the at least one second electrode is pin-shaped, one end of the battery module first entering the accommodating cavity is defined as a front end, the battery circuit board is disposed at a front end portion of the housing body, and at least one inserting hole for the at least one second electrode to insert into is defined on a front end surface of the housing body. The driving circuit board is disposed in front of the battery module. The at least one inserting hole is configured to guide and position, effectively leading the at least one second electrode in contact with the at least one first electrode.

The battery module is connected to the driving circuit board through a magnetic attraction structure, so that in the accommodating cavity, the battery module is fixed with respect to the driving circuit board for ensuring stability of power supply.

The magnetic attraction structure includes at least one movable magnetic component and at least one fixed magnetic component, the at least one movable magnetic component is disposed on the battery module, and the at least one fixed magnetic component are disposed on the driving circuit board.

In one or more embodiments of the present disclosure, both the at least one movable magnetic component and the at least one fixed magnetic component are magnets; or, the at least one movable magnetic component is at least one magnet, and the at least one fixed magnetic component is at least one metal electrically attracted by the at least one magnet; or, the at least one fixed magnetic component is the at least one magnet, and the at least one movable magnetic component is the at least one metal electrically attracted by the at least one magnet.

A supporting plate is disposed in the accommodating cavity and is vertically disposed in front of the battery module, the driving circuit board and the supporting plate are in contact and are fixedly connected through at least one fixing screw. The at least one movable magnetic component is at least one magnet, the at least one fixed magnetic component is the at least one fixing screw, the at least one fixed magnetic component is magnetically attracted and fixed by a head portion of the at least one fixing screw. In this technical solution, the at least one fixing screw for fixing the driving circuit board serve as the at least one fixed magnetic component, there is no need for additional magnetic components, thereby reducing costs.

The accommodating cavity defines at least one guiding groove, the battery module includes at least one protruding rail portion, and the at least one protruding rail portion is in sliding fit with the at least one guiding groove. The at least one protruding rail is in sliding fit with the at least one guiding groove for guiding and positioning the battery module in process of inserting or pulling out of the battery module, which is convenient for the mounting and detaching of the battery module and further ensures accurate alignment for the electrical connection.

Two limiting plates are symmetrically disposed in the accommodating cavity, the two limiting plates respectively extend toward an interior portion of the accommodating cavity from two sides of the access opening, two guiding grooves are provided and are respectively defined on the two limiting plates, two protruding rail portions are provided and are respectively disposed at two sides of the battery module, the battery module is disposed between the two limiting plates.

A charging interface is disposed on the battery module. The charging interface is disposed on the battery circuit board and is exposed at the front end portion of the housing body. The charging interface is disposed at the front end portion of the housing body and the battery module is disposed in the accommodating cavity after mounting, which avoids dust accumulation.

Heat dissipation fins are disposed on an outer wall of the battery module, which improves heat dissipation efficiency to further improve stability of the battery module during charging and discharging.

The housing body includes a bottom housing and a housing cover. the bottom housing defines a housing opening, and the housing cover covers the housing opening of the bottom housing.

A rear end surface of the battery module is matched with the access opening, and a pull ring is disposed on the rear surface of the battery module for hand-held, which is convenient for inserting the battery module and pulling out the battery module, so that mounting and detaching the battery module is easier and more convenient.

The pull ring is hinged to the battery module to switch between a folded position proximate the battery module and a pull position away from the battery module. The pull ring is foldable and retractable, so as to prevent the battery module from unintentionally pulling out.

The wall light fixture further includes a connecting tube, the connecting tube is fixed on the base and is communicated with the base. One end of the at least one lamp body is foldably connected to the connecting tube for convenience of storage.

The at least one lamp body includes a lamp tube, a light emitting diode (LED) light bar, and a light-transmitting cover. The lamp tube defines a light-emitting opening extending along a length direction thereof, the light-transmitting cover covers the light-emitting opening. The LED light bar and the driving circuit board are electrically connected through a wire. The connecting tube is configured for the wire to pass through.

The connecting tube includes at least two branch tubes. At least two lamp bodies are provided, matching the same number of the at least two branch tubes. Each of the at least two lamp bodies is connected to a corresponding one of the at least two branch tubes.

The wall light fixture includes a control circuit board. The control circuit board is disposed in the base, the control circuit board is electrically connected to the driving circuit board and is configured to control switching and light modes of the at least one lamp body. An infrared receiving probe for receiving a remote control signal is disposed on the control circuit board, the infrared receiving probe protrudes out of the base. In this technical solution, the wall light fixture is controlled by remote control.

The base includes an outer housing and a rear plate. At least one first connecting column is disposed in the outer housing. The outer housing defines an opening at a rear surface thereof, the rear plate is disposed on the opening, and the rear plate is connected and fixed to the at least one first connecting column through at least one first screw.

At least one second connecting column is disposed in the outer housing. The control circuit board is disposed on the at least one second connecting column and is fixedly connected to the at least one second connecting column through at least one second screw.

In one embodiment of the present disclosure, a double-sided adhesive is disposed on the rear plate, the rear plate is configured to attach and fix to a wall surface.

In another embodiment of the present disclosure, the wall light fixture further includes a hanging plate, the hanging plate is configured to connect to a wall surface, connecting holes are respectively defined on two sides of the base, and the connecting holes are configured to connect to the hanging plate.

Figure 1:
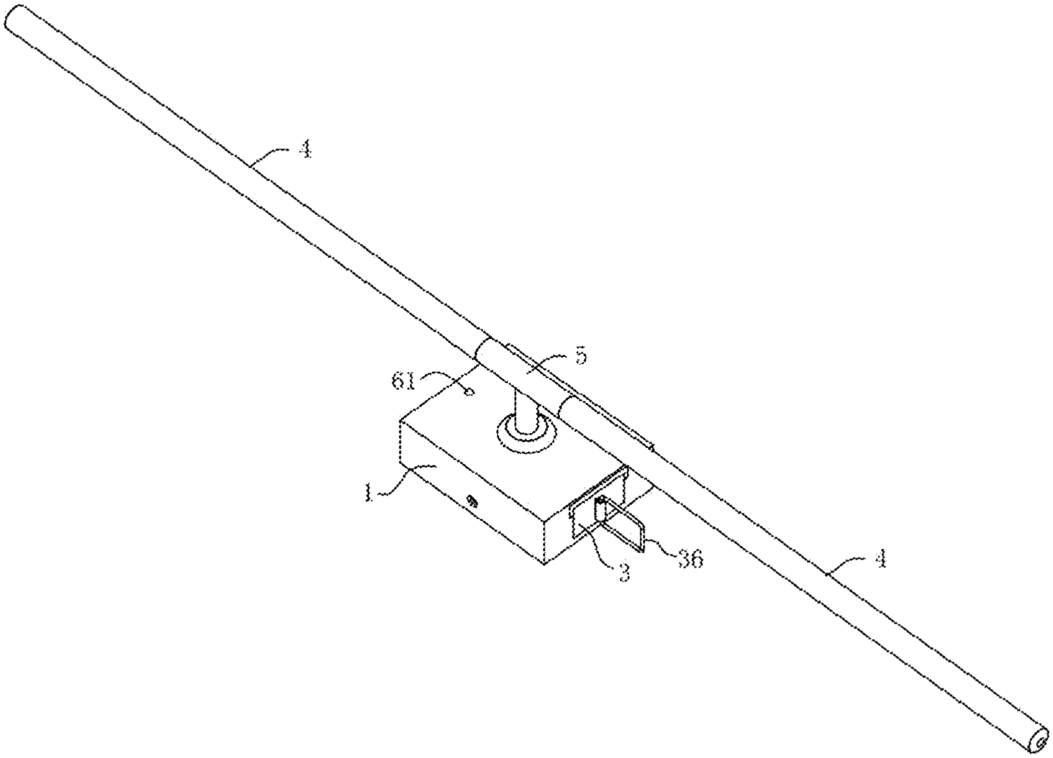
FIG. 1 is a structural schematic diagram of the present disclosure.

Reference numerals in the drawings: 1. base; 11. outer housing; 111. accommodating cavity; 112. access opening; 113. limiting plate; 114. guiding groove; 115. supporting plate; 116. first connecting column; 117. second connecting column; 12. rear plate; 121. double-sided adhesive; 118. connecting hole; 13. hanging plate; 2. driving circuit board; 21. second electrode; 22. fixing screw; 3. battery module; 31. bottom housing; 311. inserting hole; 32. housing cover; 321. protruding rail portion; 322. heat dissipation fin; 33. battery circuit board; 331. first electrode; 332. charging interface; 34. rechargeable battery; 35. column-shaped magnet; 36. pull ring; 4. lamp body; 41. lamp tube; 42. light emitting diode (LED) light bar; 43. light-transmitting cover; 5. connecting tube; 51. main tube; 52. branch tube; 6. control circuit board; 61. infrared receiving probe; 7. wall surface.

DETAILED DESCRIPTION OF EMBODIMENTS

Solutions of the present disclosure are further described below with reference to accompanying drawings.

First Embodiment

Figure 2:
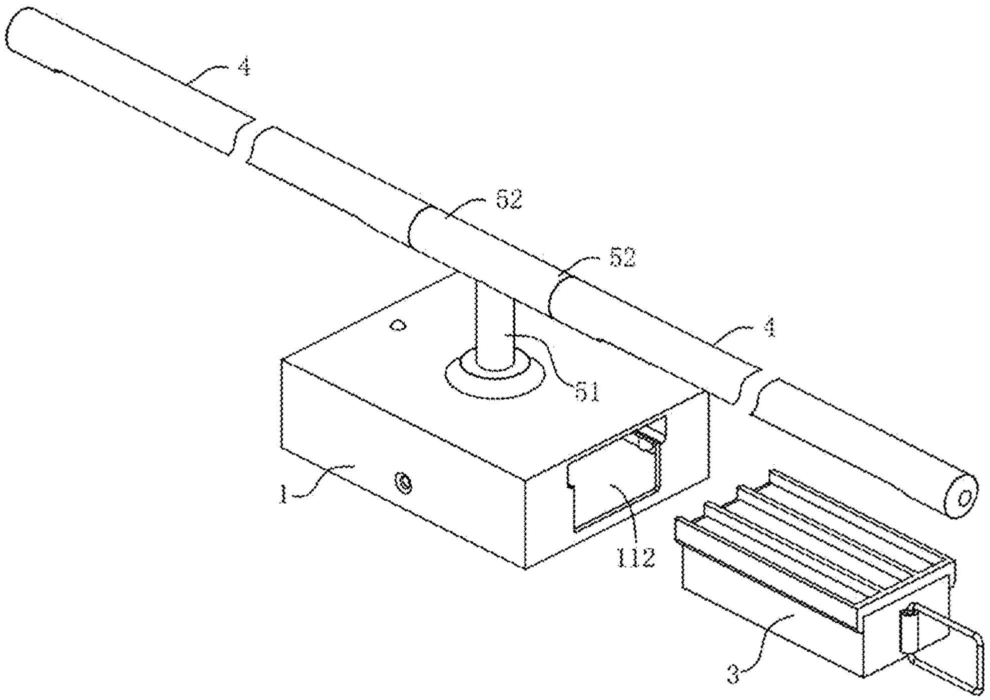
FIG. 2 is a structural schematic diagram illustrating a battery module pulling out of an accommodating cavity of the present disclosure.
Figure 3:
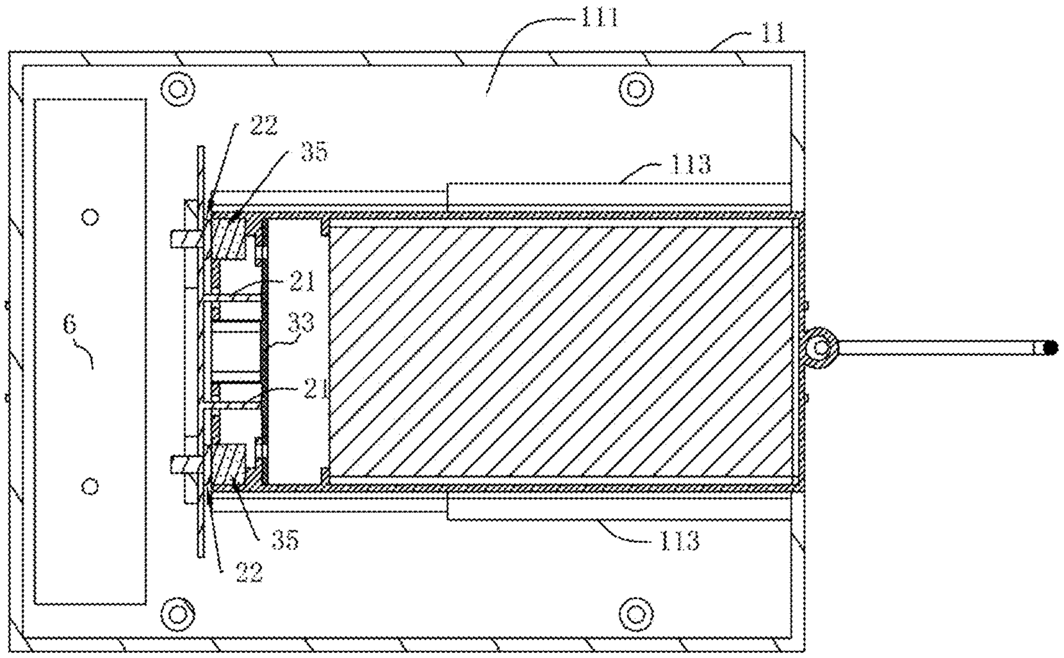
FIG. 3 is a cross-sectional schematic diagram of the present disclosure.
Figure 4:
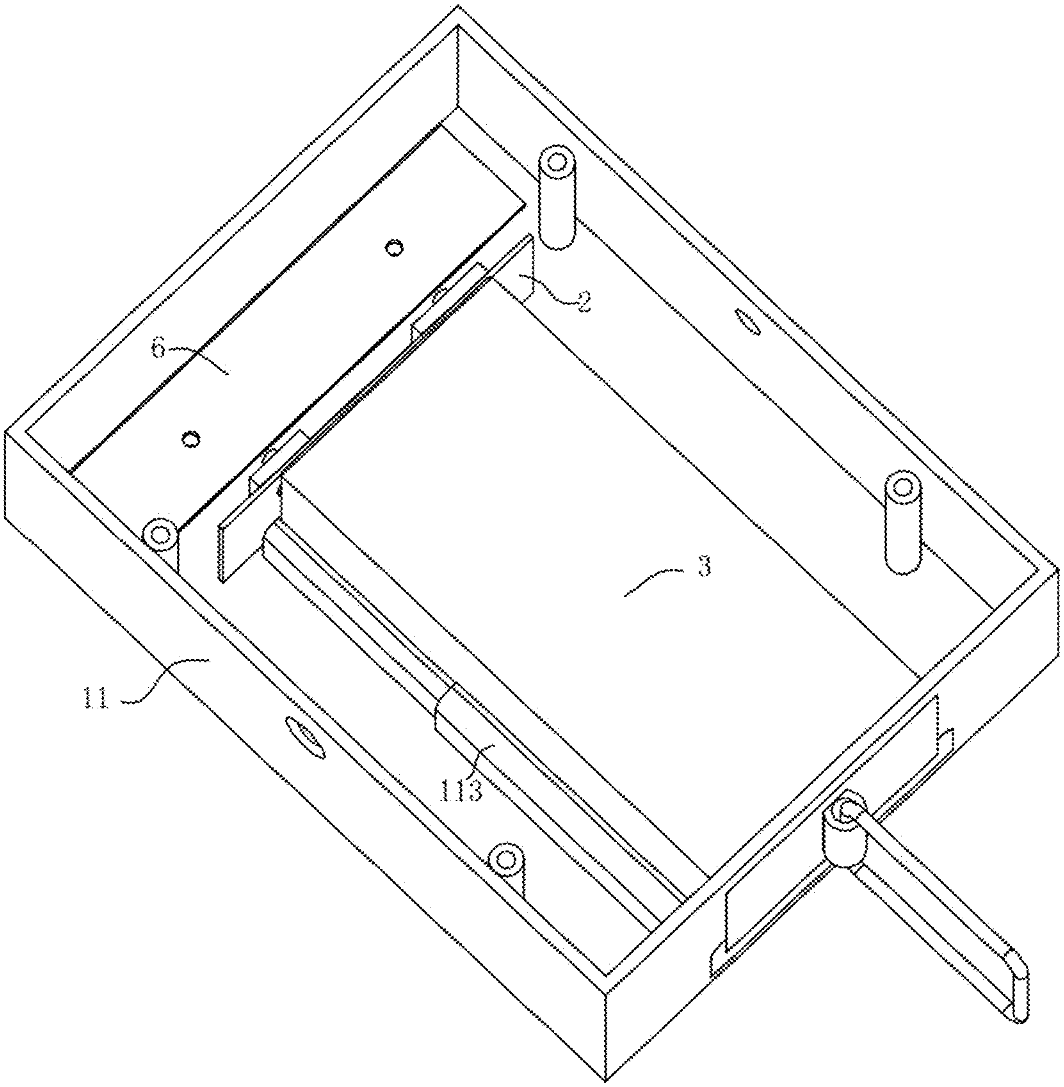
FIG. 4 is an internal structural schematic diagram of a base of the present disclosure.
Figure 5:
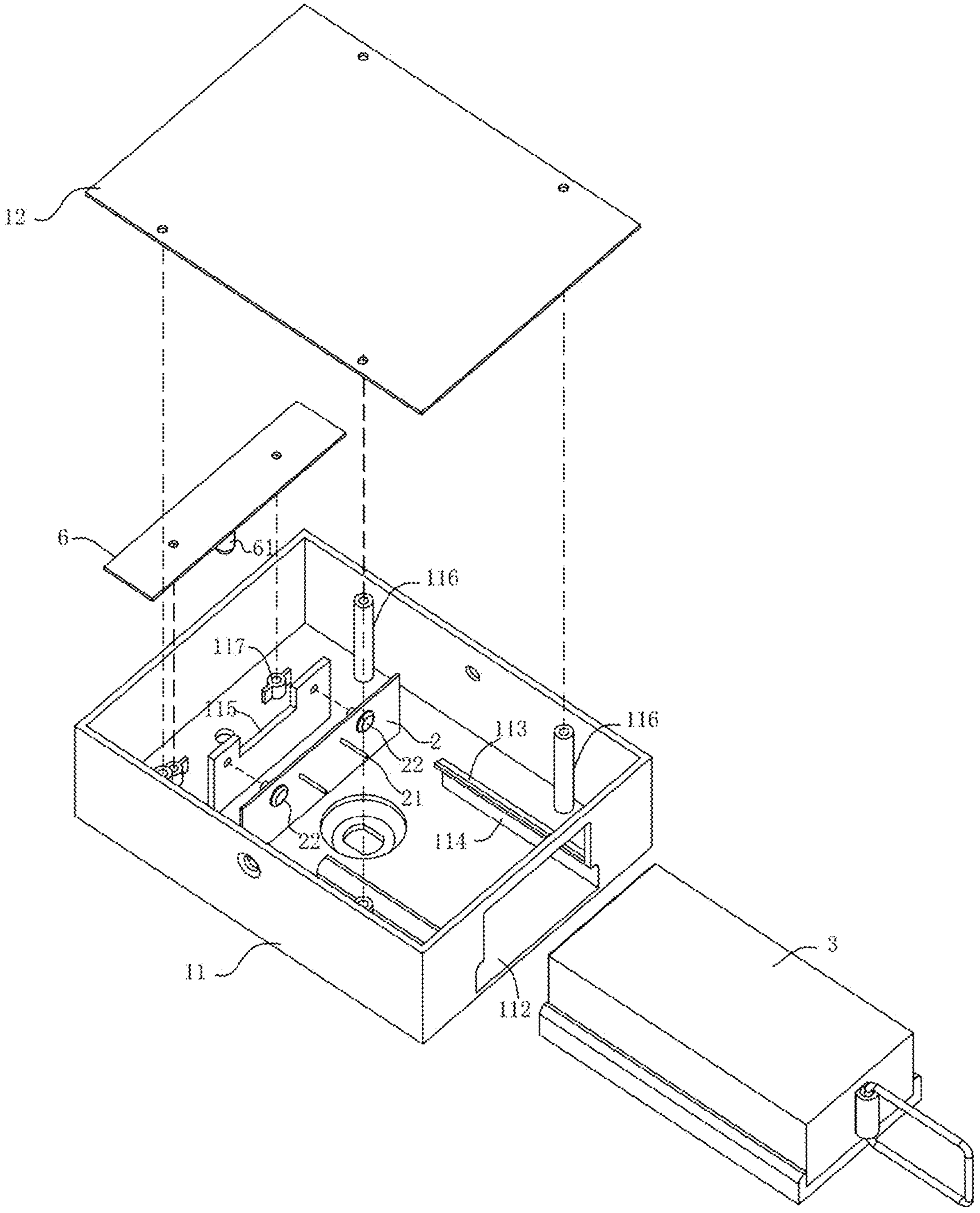
FIG. 5 is an exploded structural schematic diagram of the base of the present disclosure.
Figure 6:
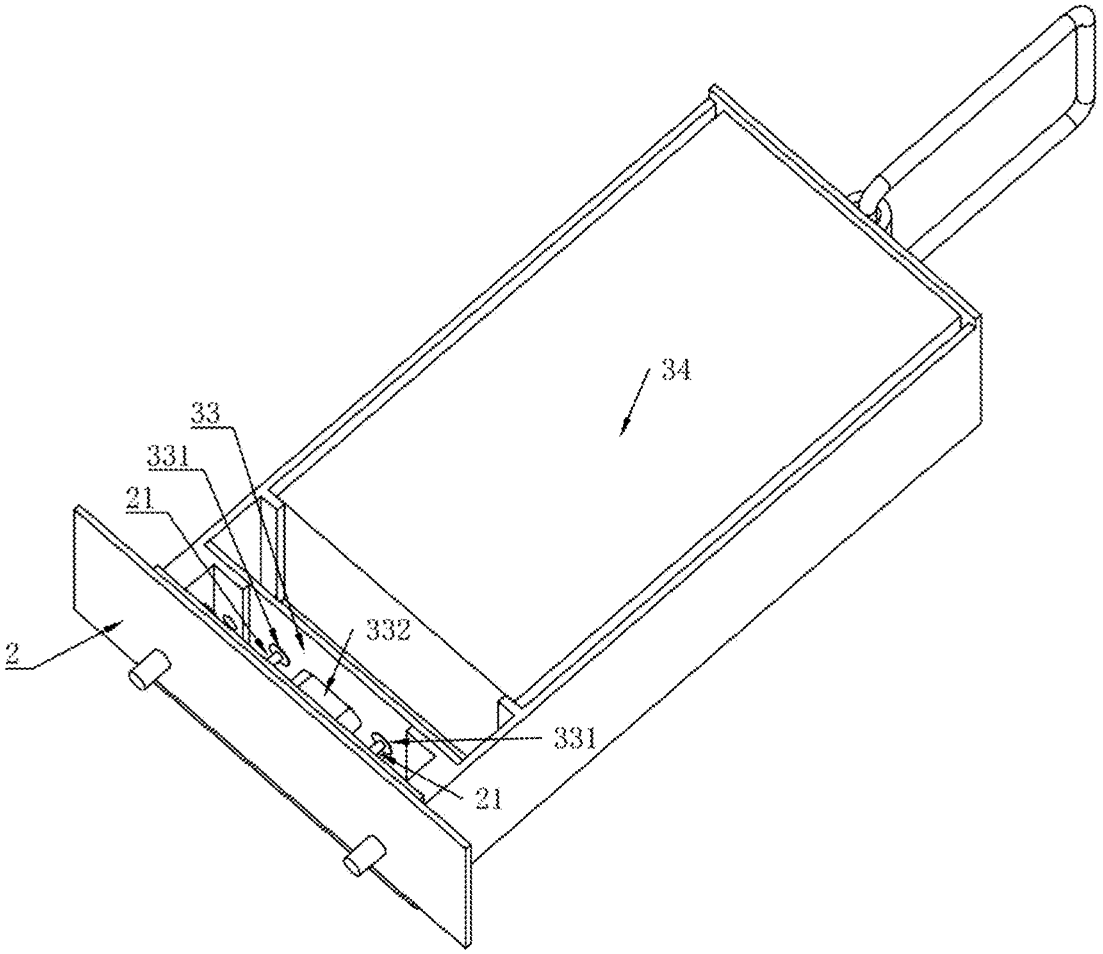
FIG. 6 is a structural schematic diagram illustrating the battery module matching with a driving circuit board after removing a housing cover of the present disclosure.
Figure 7:
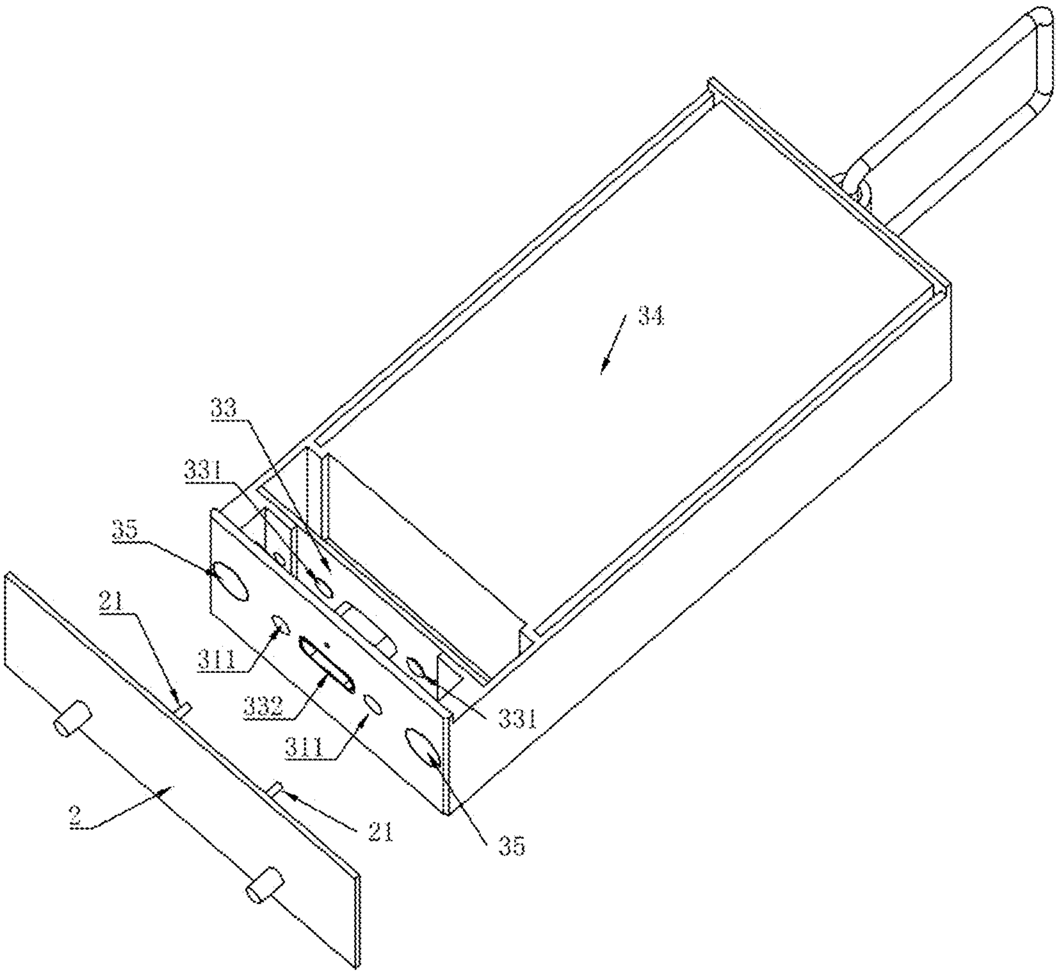
FIG. 7 is an exploded structural schematic diagram illustrating the battery module matching with the driving circuit board after removing the housing cover of the present disclosure.
Figure 8:
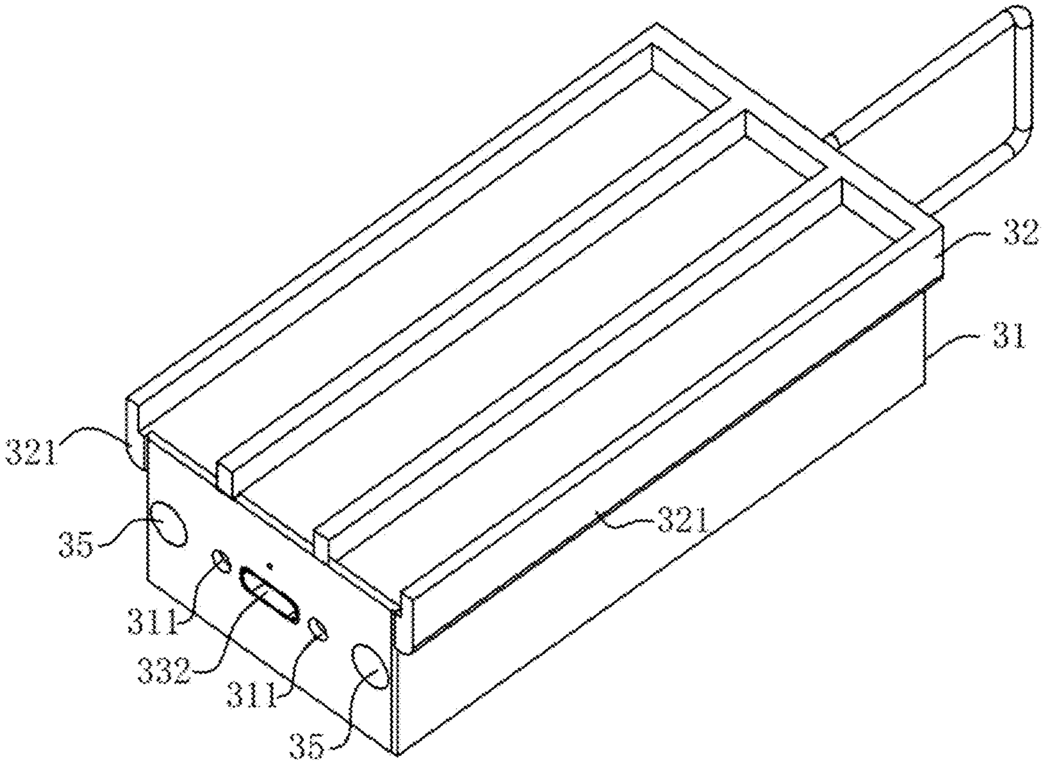
FIG. 8 is a structural schematic diagram of the battery module of the present disclosure.
Figure 9:
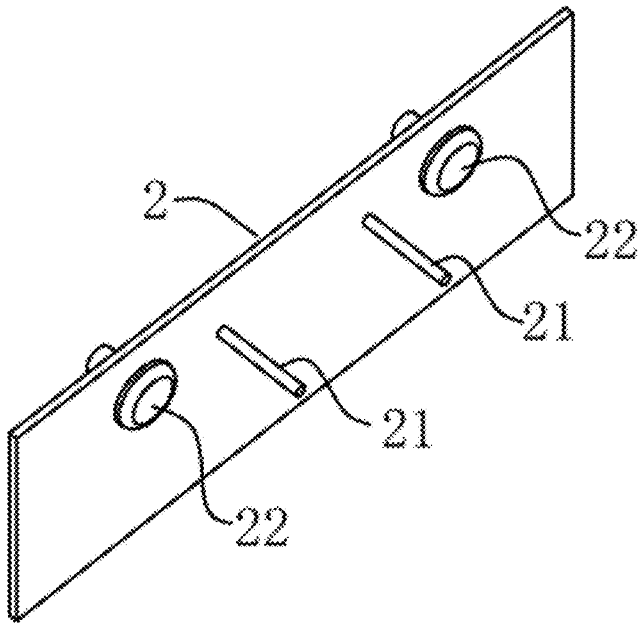
FIG. 9 is a structural schematic diagram of the driving circuit board of the present disclosure.
Figure 10:
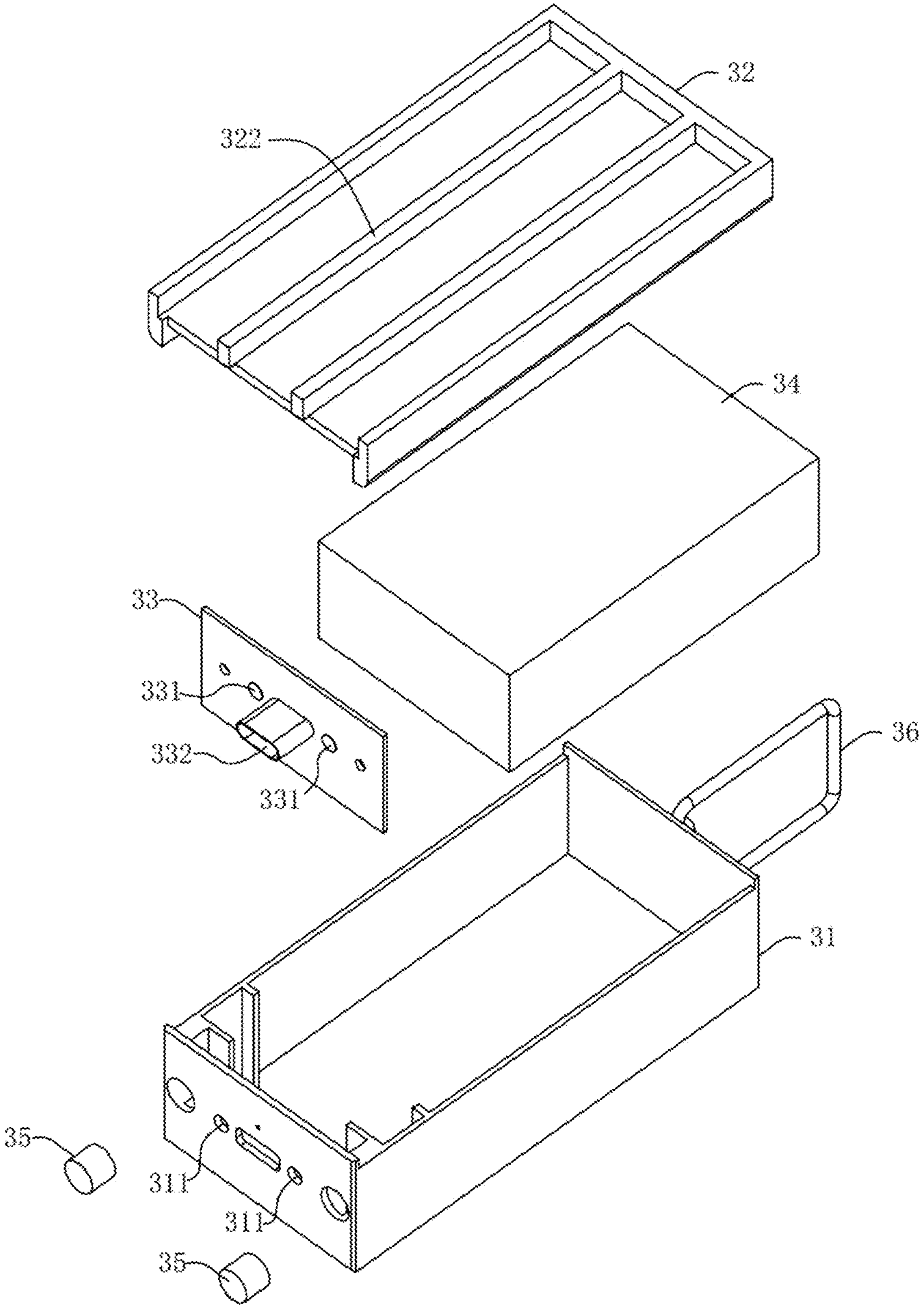
FIG. 10 is an exploded structural schematic diagram of the battery module of the present disclosure.
Figure 11:
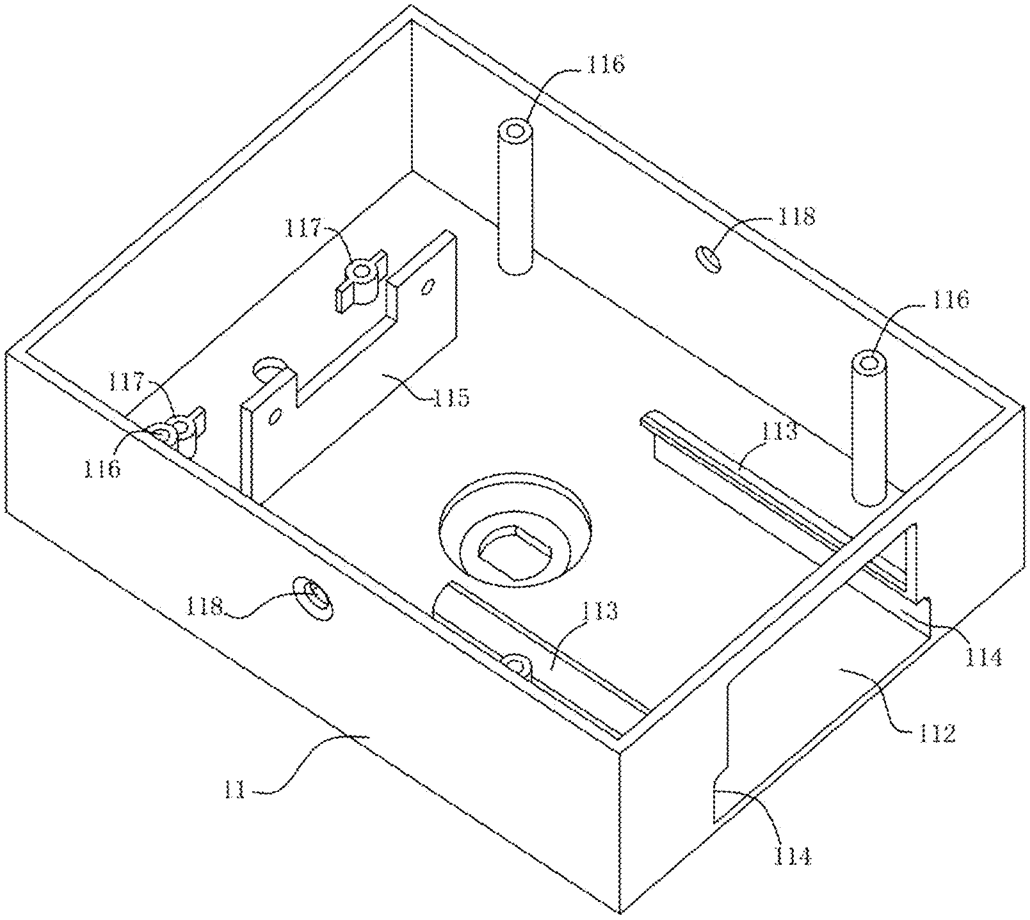
FIG. 11 is a structural schematic diagram of an outer housing of the base of the present disclosure.
Figure 12:
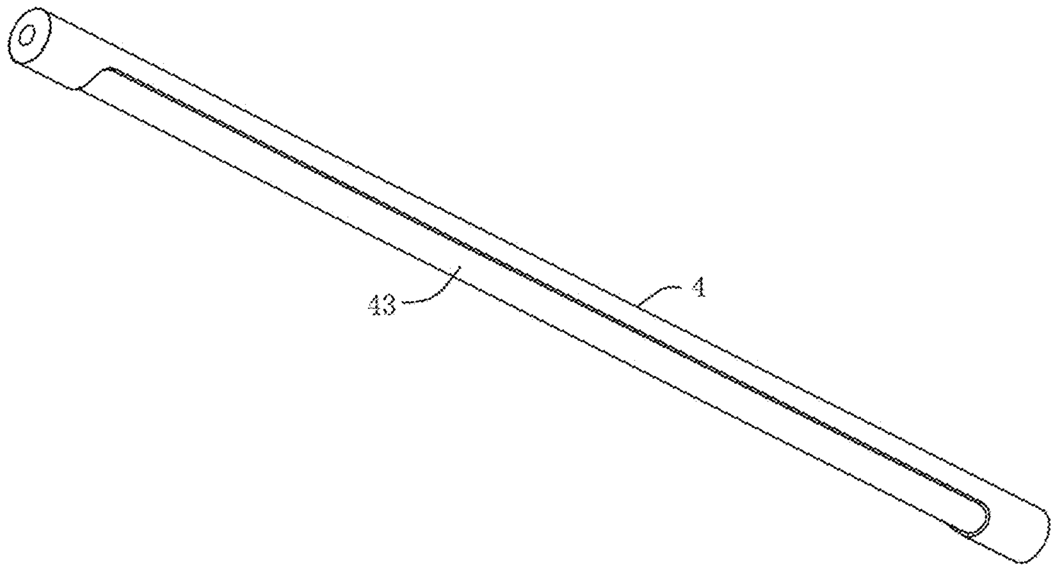
FIG. 12 is a structural schematic diagram of a lamp body of the present disclosure.
Figure 13:
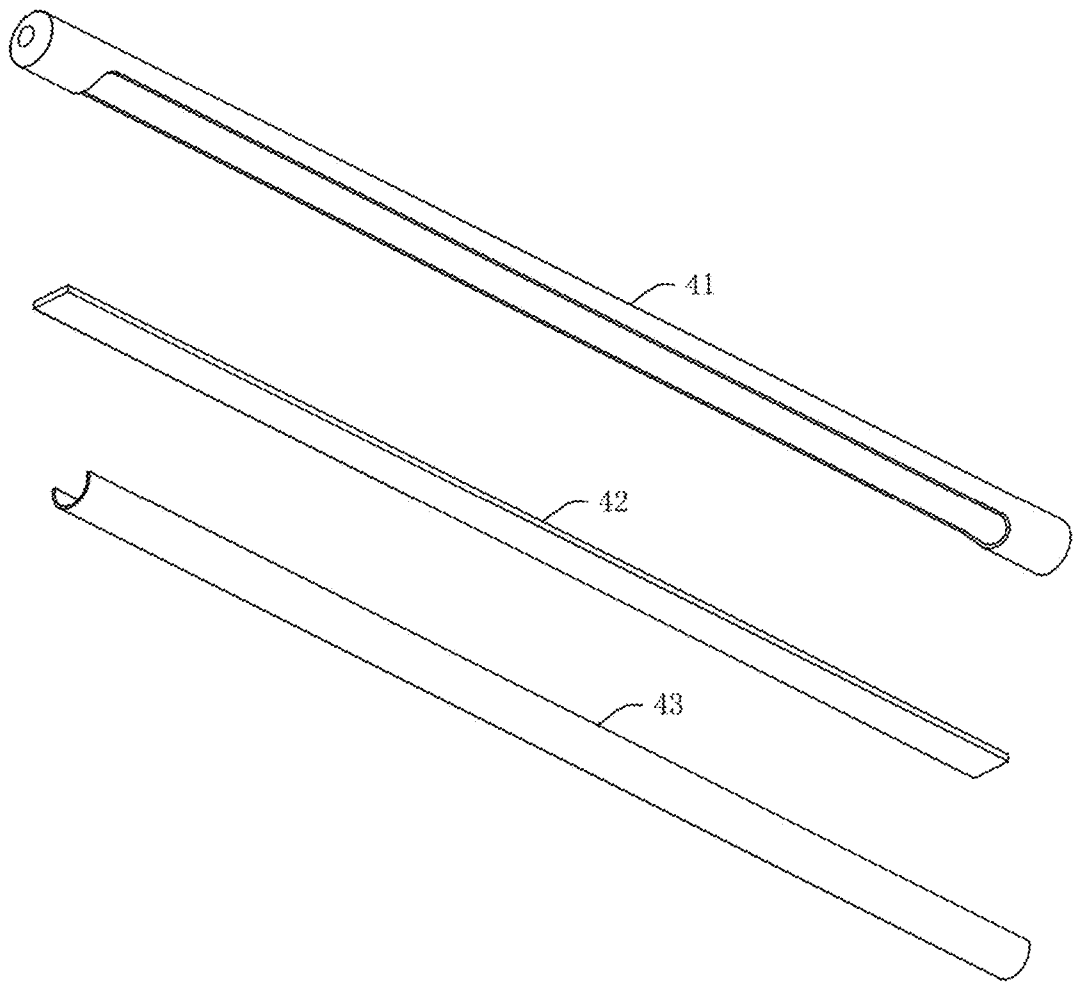
FIG. 13 is an exploded structural schematic diagram of the lamp body of the present disclosure.

Please refer to FIGS. 1-14, the present disclosure provides a wall light fixture, including a base 1, at least one lamp body 4, a driving circuit board 2, and a battery module 3. The at least one lamp body 4 is disposed on the base 1, the driving circuit board 2 is disposed in the base 1, and the driving circuit board 2 is electrically connected to the at least one lamp body 4. The battery module 3 is configured to supply power to the at least one lamp body 4. The base 1 defines an accommodating cavity 111, the battery module 3 is detachably disposed in the accommodating cavity 111. The base 1 defines an accommodating cavity 111, the battery module 3 is detachably disposed in the accommodating cavity 111. An access opening 112 is defined at one side of the base 1, the access opening 112 is communicated with the accommodating cavity 111 for the battery module 3 to be inserted into the accommodating cavity 111 or pulled out of the accommodating cavity 111. The battery module 3 includes at least one first electrode 331. The driving circuit board 2 includes at least one second electrode 21. The at least one first electrode 331 is in contact with the at least one second electrode 21 to establish electrical connection when the battery module 3 is inserted into the accommodating cavity 111, as shown in FIGS. 3 and 6. The at least one first electrode 331 is separated from the at least one second electrode 21 to disconnect the electrical connection when the battery module 3 is pulled out of the accommodating cavity 111, as shown in FIGS. 2 and 7.

According to technical solutions of the present disclosure, the wall light fixture provides the battery module 3 being independent for supplying power, which does not require complex wiring to be connected to an external power supply. Moreover, the battery module 3 is detachably disposed in the accommodating cavity 111 of the base 1, which is enabled to be taken out for charging, the battery module 3 is mounted and detached in a way of inserting or pulling out, and electrical connection and electrical disconnection are simultaneously achieved with mounting and detaching of the battery module 3, enabling a simple and quick operation. During use, the battery module 3 is disposed in the accommodating cavity 111 and is prevented from environmental influences.

The battery module 3 includes a housing body, a battery circuit board 33, and a rechargeable battery 34, the battery circuit board 33 and the rechargeable battery 34 are disposed in the housing body, the battery circuit board 33 is electrically connected to the rechargeable battery 34. The at least one first electrode 331 is disposed on the battery circuit board 33, the at least one second electrode 21 is pin-shaped, one end of the battery module 3 first entering the accommodating cavity 111 is defined as a front end, the battery circuit board 33 is disposed at a front end portion of the housing body, and at least one inserting hole 311 for the at least one second electrode 21 to insert into is defined on a front end surface of the housing body. The driving circuit board 2 is disposed in front of the battery module 3. The at least one second electrode 21 is in contact with the at least one first electrode 331 to establish the electrical connection after being inserted into the at least one inserting hole 311, the at least one inserting hole 311 is configured to guide and position, effectively leading the at least one second electrode 21 in contact with the at least one first electrode 331.

The housing body includes a bottom housing 31 and a housing cover 32. the bottom housing 31 defines a housing opening, and the housing cover 32 covers the housing opening of the bottom housing 31.

The battery module 3 is connected to the driving circuit board 2 through a magnetic attraction structure, so that in the accommodating cavity 111, the battery module 3 is fixed with respect to the driving circuit board 2 for ensuring stability of power supply. The magnetic attraction structure includes at least one movable magnetic component and at least one fixed magnetic component, the at least one movable magnetic component is disposed on the battery module 3, and the at least one fixed magnetic component are disposed on the driving circuit board 2.

A supporting plate 115 is disposed in the accommodating cavity 111 and is vertically disposed in front of the battery module 3, the driving circuit board 2 and the supporting plate 115 are in contact and are fixedly connected through at least one fixing screw 22. The at least one movable magnetic component is at least one magnet, specifically at least one column-shaped magnet 35, the at least one fixed magnetic component is the at least one fixing screw 22, the at least one fixed magnetic component is magnetically attracted and fixed by a head portion of the at least one fixing screw 22. In this technical solution, the at least one fixing screw 22 for fixing the driving circuit board 2 serve as the at least one fixed magnetic component, there is no need for additional magnetic components, thereby reducing costs.

The accommodating cavity 111 defines at least one guiding groove 114, the battery module 3 includes at least one protruding rail portion 321, and the at least one protruding rail portion 321 is in sliding fit with the at least one guiding groove 114. The at least one protruding rail is in sliding fit with the at least one guiding groove 114 for guiding and positioning the battery module in process of inserting or pulling out of the battery module 3, which is convenient for the mounting and detaching of the battery module 3 and further ensures accurate alignment for the electrical connection.

Specifically, two limiting plates 113 are symmetrically disposed in the accommodating cavity 111, the two limiting plates 113 respectively extend toward an interior portion of the accommodating cavity 111 from two sides of the access opening 112, two guiding grooves 114 are provided and are respectively defined on the two limiting plates 113, two protruding rail portions 321 are provided and are respectively disposed at two sides of the battery module 3, the battery module 3 is disposed between the two limiting plates 113. Specifically, the two protruding rail portions 321 are respectively disposed at two sides of the housing cover 32.

In the embodiment, two column-shaped magnets 35 are provided and are embedded at a front end of the housing body, and two fixing screws 22 are provided.

A charging interface 332 is disposed on the battery module 3. Specifically, the charging interface 332 is disposed on the battery circuit board 33 and is exposed at the front end portion of the housing body. In this technical solution, the charging interface 332 is disposed at the front end portion of the housing body and the battery module 3 is disposed in the accommodating cavity 111 after mounting, which avoids dust accumulation.

Heat dissipation fins 322 are disposed on an outer wall of the battery module 3, which improves heat dissipation efficiency to further improve stability of the battery module 3 during charging and discharging. Specifically, the heat dissipation fins 322 are disposed on the housing cover 32 and extend along a length direction of the battery module 3.

A rear end surface of the battery module 3 is matched with the access opening 112, and a pull ring 36 is disposed on the rear surface of the battery module 3 for hand-held, which is convenient for inserting the battery module 3 and pulling out the battery module 3, so that mounting and detaching the battery module 3 is easier and more convenient.

The pull ring 36 is hinged to the battery module 3 to switch between a folded position proximate the battery module 3 and a pull position away from the battery module 3. The pull ring 36 is foldable and retractable, so as to prevent the battery module 3 from unintentionally pulling out.

The wall light fixture further includes a connecting tube 5, the connecting tube 5 is fixed on the base 1 and is communicated with the base 1. One end of the at least one lamp body 4 is foldably connected to the connecting tube 5 for convenience of storage.

The at least one lamp body 4 includes a lamp tube 41, a light emitting diode (LED) light bar 42, and a light-transmitting cover 43. The lamp tube 41 defines a light-emitting opening extending along a length direction thereof, the light-transmitting cover 43 covers the light-emitting opening. The LED light bar 42 and the driving circuit board 2 are electrically connected through a wire. The connecting tube 5 is configured for the wire to pass through.

The connecting tube 5 includes at least two branch tubes 52. At least two lamp bodies are provided, matching the same number of the at least two branch tubes 52. Each of the at least two lamp bodies is connected to a corresponding one of the at least two branch tubes 52.

In the embodiment, the connecting tube 5 is a T-shaped three-way tube, including a main tube 51 and two branch tubes 52, the main tube 51 is fixed to the base 1 and the two branch tubes 52 are communicated with the main tube 51, and the two branch tubes 52 are aligned in a straight line. Two lamp bodies 4 are provided.

After the two lamp bodies 4 are respectively connected to the two branch tubes 52, an overall length of the wall light fixture is long, and during storage of the wall light fixture, the two lamp bodies 4 are capable of being separated from the two branches 52 to reduce the overall length of the wall light fixture.

The wall light fixture includes a control circuit board 6. The control circuit board 6 is disposed in the base 1, the control circuit board 6 is electrically connected to the driving circuit board 2 and is configured to control switching and light modes of the at least one lamp body 4. An infrared receiving probe 61 for receiving a remote control signal is disposed on the control circuit board 6, the infrared receiving probe 61 protrudes out of the base 1. In this technical solution, the wall light fixture is controlled by remote control.

The base 1 includes an outer housing 11 and a rear plate 12. At least one first connecting column 116 and at least one second connecting column 117 are disposed in the outer housing 11. The outer housing 11 defines an opening at a rear surface thereof, the rear plate 12 is disposed on the opening, and the rear plate 12 is connected and fixed to the at least one first connecting column 116 through at least one first screw. The control circuit board 6 is disposed on the at least one second connecting column 117 and is fixedly connected to the at least one second connecting column 117 through at least one second screw.

Figure 14:
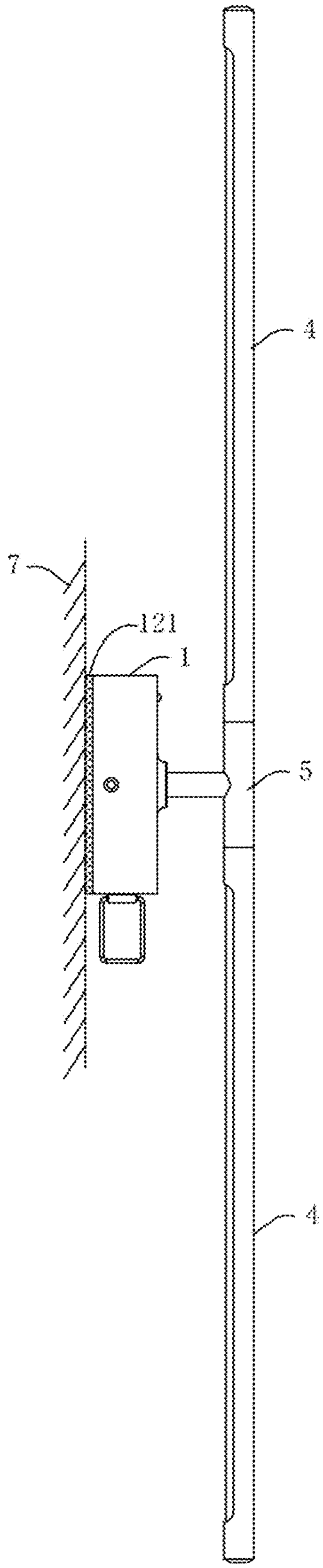
FIG. 14 is a mounting schematic diagram according to a first embodiment of the present disclosure.

In the embodiment, a double-sided adhesive 121 is disposed on the rear plate 12, the rear plate 12 is configured to attach and fix to a wall surface 7, as shown in FIG. 14, when mounting the wall light fixture, the wall light fixture only needs to be directly attached to the wall surface 7.

Second Embodiment

Figure 15:
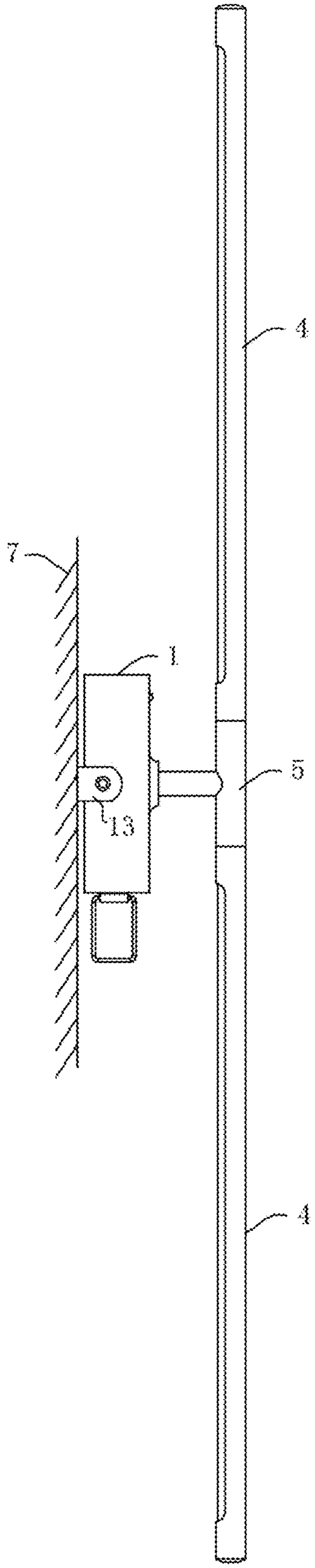
FIG. 15 is a mounting schematic diagram according to a second embodiment of the present disclosure.

As shown in FIG. 15, the second embodiment of the present disclosure provides the wall light fixture, differing from the first embodiment in that the wall light fixture further includes a hanging plate 13, the hanging plate 13 is configured to connect to a wall surface 7, connecting holes 118 are respectively defined on two sides of the base 1, and the connecting holes 118 are configured to connect to the hanging plate 13. Mounting ears are respectively disposed at two sides of the hanging plate, the mounting ears and the connecting holes 118 are fixedly connected through third screws.

Preferred embodiments described above should be regarded as illustrative examples of implementation of the present disclosure. Any technical deductions, substitutions, improvements, etc., that are identical, similar, or based on the solutions of the present disclosure shall be considered within a protection scope of the present disclosure.

What is claimed is:

1. A wall light fixture, comprising:

a base;

at least one lamp body;

a driving circuit board; and a battery module;

wherein the at least one lamp body is disposed on the base, the driving circuit board is disposed in the base, and the driving circuit board is electrically connected to the at least one lamp body;

wherein the battery module is configured to supply power to the at least one lamp body;

wherein the base defines an accommodating cavity, the battery module is detachably disposed in the accommodating cavity;

wherein an access opening is defined at one side of the base, the access opening is communicated with the accommodating cavity for the battery module to be inserted into the accommodating cavity or pulled out of the accommodating cavity;

wherein the battery module comprises at least one first electrode;

wherein the driving circuit board comprises at least one second electrode;

wherein the at least one first electrode is in contact with the at least one second electrode to establish electrical connection when the battery module is inserted into the accommodating cavity;

wherein the at least one first electrode is separated from the at least one second electrode to disconnect the electrical connection when the battery module is pulled out of the accommodating cavity;

wherein the battery module comprises a housing body, a battery circuit board, and a rechargeable battery, the battery circuit board and the rechargeable battery are disposed in the housing body, the battery circuit board is electrically connected to the rechargeable battery;

the at least one first electrode is disposed on the battery circuit board, the at least one second electrode is pin-shaped, one end of the battery module first entering the accommodating cavity is defined as a front end, the battery circuit board is disposed at a front end portion of the housing body, and at least one inserting hole for the at least one second electrode to insert into is defined on a front end surface of the housing body; and the driving circuit board is disposed in front of the battery module.

2. The wall light fixture according to claim 1, wherein the battery module is connected to the driving circuit board through a magnetic attraction structure; and the magnetic attraction structure comprises at least one movable magnetic component and at least one fixed magnetic component, the at least one movable magnetic component is disposed on the battery module, and the at least one fixed magnetic component are disposed on the driving circuit board.

3. The wall light fixture according to claim 2, wherein both the at least one movable magnetic component and the at least one fixed magnetic component are magnets; or the at least one movable magnetic component is at least one magnet, and the at least one fixed magnetic component is at least one metal electrically attracted by the at least one magnet; or the at least one fixed magnetic component is the at least one magnet, and the at least one movable magnetic component is the at least one metal electrically attracted by the at least one magnet.

4. The wall light fixture according to claim 2, wherein a supporting plate is disposed in the accommodating cavity and is vertically disposed in front of the battery module, the driving circuit board and the supporting plate are in contact and are fixedly connected through at least one fixing screw; and the at least one movable magnetic component is at least one magnet, the at least one fixed magnetic component is the at least one fixing screw, the at least one fixed magnetic component is magnetically attracted and fixed by a head portion of the at least one fixing screw.

5. The wall light fixture according to claim 1, wherein a charging interface is disposed on the battery module; and the charging interface is disposed on the battery circuit board and is exposed at the front end portion of the housing body.

6. The wall light fixture according to claim 1, wherein heat dissipation fins are disposed on an outer wall of the battery module.

7. The wall light fixture according to claim 1, wherein the housing body comprises a bottom housing and a housing cover; and the bottom housing defines a housing opening, and the housing cover covers the housing opening of the bottom housing.

8. The wall light fixture according to claim 7, wherein the pull ring is hinged to the battery module to switch between a folded position proximate the battery module and a pull position away from the battery module.

9. The wall light fixture according to claim 1, wherein a rear end surface of the battery module is matched with the access opening, and a pull ring is disposed on the rear surface of the battery module.

10. The wall light fixture according to claim 1, wherein the wall light fixture further comprises a connecting tube, the connecting tube is fixed on the base and is communicated with the base; and one end of the at least one lamp body is foldably connected to the connecting tube.

11. The wall light fixture according to claim 10, wherein the at least one lamp body is elongated;

the at least one lamp body comprises a lamp tube, a light emitting diode (LED) light bar, and a light-transmitting cover;

the lamp tube defines a light-emitting opening extending along a length direction thereof, the light-transmitting cover covers the light-emitting opening; and the LED light bar and the driving circuit board are electrically connected through a wire; and the connecting tube is configured for the wire to pass through.

12. The wall light fixture according to claim 11, wherein the connecting tube comprises at least two branch tubes;

at least two lamp bodies are provided, matching the same number of the at least two branch tubes; and each of the at least two lamp bodies is connected to a corresponding one of the at least two branch tubes.

13. A wall light fixture, comprising:

a base;

at least one lamp body;

a driving circuit board; and a battery module;

wherein the at least one lamp body is disposed on the base, the driving circuit board is disposed in the base, and the driving circuit board is electrically connected to the at least one lamp body;

wherein the battery module is configured to supply power to the at least one lamp body;

wherein the base defines an accommodating cavity, the battery module is detachably disposed in the accommodating cavity;

wherein an access opening is defined at one side of the base, the access opening is communicated with the accommodating cavity for the battery module to be inserted into the accommodating cavity or pulled out of the accommodating cavity;

wherein the battery module comprises at least one first electrode;

wherein the driving circuit board comprises at least one second electrode;

wherein the at least one first electrode is in contact with the at least one second electrode to establish electrical connection when the battery module is inserted into the accommodating cavity;

wherein the at least one first electrode is separated from the at least one second electrode to disconnect the electrical connection when the battery module is pulled out of the accommodating cavity;

wherein the accommodating cavity defines at least one guiding groove, the battery module comprises at least one protruding rail portion, and the at least one protruding rail portion is in sliding fit with the at least one guiding groove.

14. The wall light fixture according to claim 13, wherein two limiting plates are symmetrically disposed in the accommodating cavity, the two limiting plates respectively extend toward an interior portion of the accommodating cavity from two sides of the access opening, two guiding grooves are provided and are respectively defined on the two limiting plates, two protruding rail portions are provided and are respectively disposed at two sides of the battery module, the battery module is disposed between the two limiting plates.

15. A wall light fixture, comprising:

a base;

at least one lamp body;

a driving circuit board; and a battery module:

wherein the at least one lamp body is disposed on the base, the driving circuit board is disposed in the base, and the driving circuit board is electrically connected to the at least one lamp body;

wherein the battery module is configured to supply power to the at least one lamp body;

wherein the base defines an accommodating cavity, the battery module is detachably disposed in the accommodating cavity;

wherein an access opening is defined at one side of the base, the access opening is communicated with the accommodating cavity for the battery module to be inserted into the accommodating cavity or pulled out of the accommodating cavity;

wherein the battery module comprises at least one first electrode;

wherein the driving circuit board comprises at least one second electrode;

wherein the at least one first electrode is in contact with the at least one second electrode to establish electrical connection when the battery module is inserted into the accommodating cavity;

wherein the at least one first electrode is separated from the at least one second electrode to disconnect the electrical connection when the battery module is pulled out of the accommodating cavity:

wherein the wall light fixture comprises a control circuit board;

the control circuit board is disposed in the base, the control circuit board is electrically connected to the driving circuit board and is configured to control switching and light modes of the at least one lamp body; and an infrared receiving probe for receiving a remote control signal is disposed on the control circuit board, the infrared receiving probe protrudes out of the base.

16. The wall light fixture according to claim 15, wherein the base comprises an outer housing and a rear plate;

at least one first connecting column is disposed in the outer housing; and the outer housing defines an opening at a rear surface thereof, the rear plate is disposed on the opening, and the rear plate is connected and fixed to the at least one first connecting column through at least one first screw.

17. The wall light fixture according to claim 16, wherein at least one second connecting column is disposed in the outer housing; and the control circuit board is disposed on the at least one second connecting column and is fixedly connected to the at least one second connecting column through at least one second screw.

18. The wall light fixture according to claim 17, wherein a double-sided adhesive is disposed on the rear plate, the rear plate is configured to attach and fix to a wall surface.

19. The wall light fixture according to claim 16, wherein the wall light fixture further comprises a hanging plate, the hanging plate is configured to connect to a wall surface, connecting holes are respectively defined on two sides of the base, and the connecting holes are configured to connect to the hanging plate.

* * * * *